United States Patent
Quinn

(10) Patent No.: US 7,182,103 B1
(45) Date of Patent: Feb. 27, 2007

(54) TUBULAR PATCH EXPANSION APPARATUS WITH INFLATABLE BLADDER

(76) Inventor: Desmond Quinn, P.O. Box 23120, Grande Prairie Alberta (CA) T8V 6X2

( * ) Notice: Subject to any disclaimer, the term of this patent is extended or adjusted under 35 U.S.C. 154(b) by 0 days.

(21) Appl. No.: 11/413,453

(22) Filed: Apr. 27, 2006

(30) Foreign Application Priority Data

Mar. 3, 2006 (CA) .................................. 2539735

(51) Int. Cl.
*F16L 55/16* (2006.01)
(52) U.S. Cl. ................ 138/98; 138/93; 166/277; 166/299
(58) Field of Classification Search ............ 138/98, 138/93, 30, 97; 166/277, 207, 299, 380, 166/63, 212
See application file for complete search history.

(56) References Cited

U.S. PATENT DOCUMENTS

| | | | | |
|---|---|---|---|---|
| 3,167,122 A | * | 1/1965 | Lang ........................... | 166/277 |
| 3,175,618 A | * | 3/1965 | Lang et al. .................... | 166/63 |
| 4,577,696 A | * | 3/1986 | Suman ......................... | 166/387 |
| 5,238,063 A | * | 8/1993 | Hebert ......................... | 166/298 |
| 5,833,001 A | * | 11/1998 | Song et al. ................... | 166/287 |
| 6,053,247 A | * | 4/2000 | Wesson et al. ............... | 166/297 |
| 6,102,120 A | * | 8/2000 | Chen et al. .................. | 166/287 |
| 2006/0162925 A1 | * | 7/2006 | Quinn ......................... | 166/277 |

FOREIGN PATENT DOCUMENTS

CA 2509414 8/2005

\* cited by examiner

*Primary Examiner*—James Hook
(74) *Attorney, Agent, or Firm*—Christensen O'Connor Johnson Kindness PLLC

(57) ABSTRACT

A tubular patch expansion apparatus includes an elongated tubular bladder adapted to expand radially outwardly to expand an overlying tubular patch. A bladder setting assembly is secured to a first end of the bladder. The bladder setting assembly has a piston which divides an interior bore into a gas generator chamber and a liquid chamber. Once ignited, gas generating medium generates gas, which causes the piston to move along the interior bore injecting liquid from the liquid chamber into the bladder to inflate the bladder. A liquid pressure relief assembly is provided to relieve pressure within the bladder by releasing liquid from the bladder to allow the bladder to collapse, when the pressure in the bladder reaches predetermined levels.

4 Claims, 5 Drawing Sheets

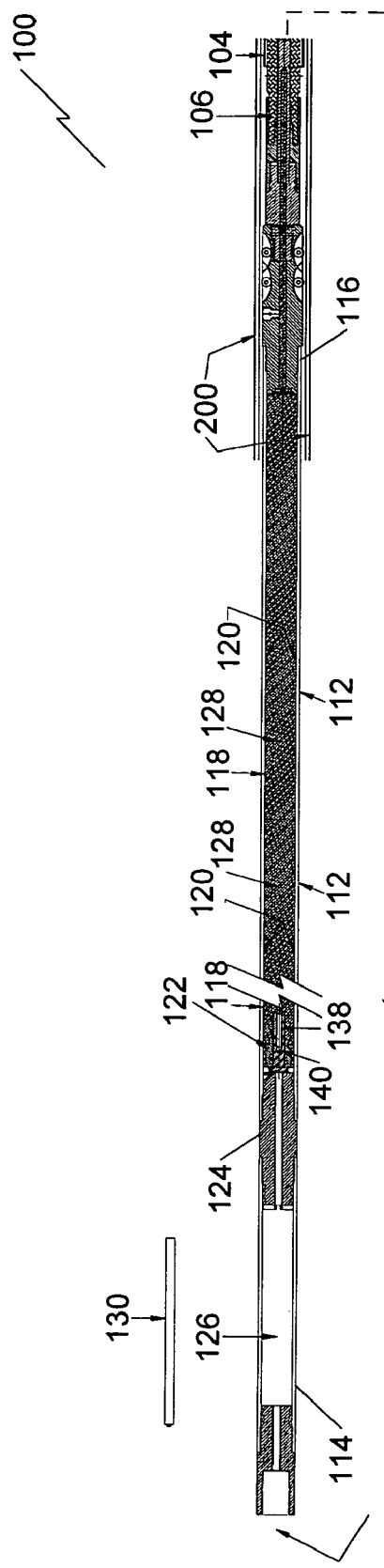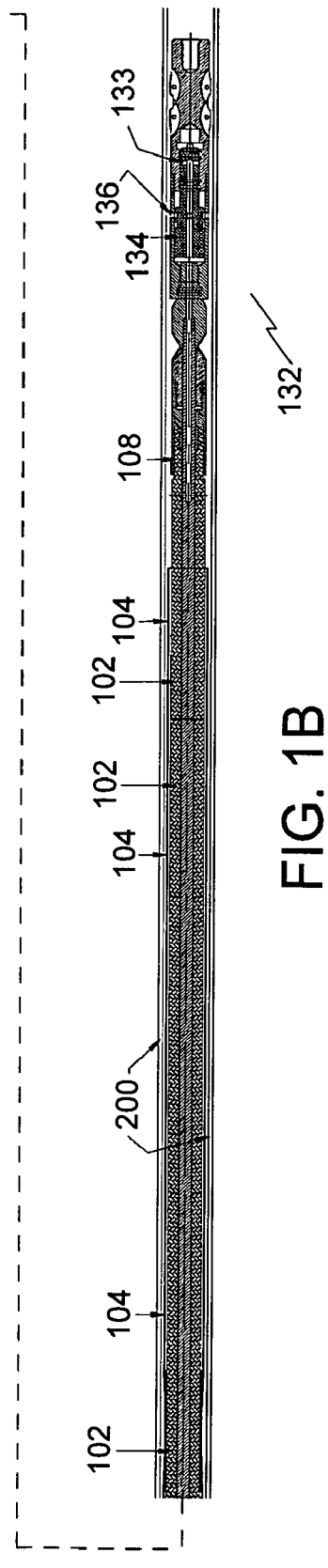
FIG. 1A
FIG. 1B

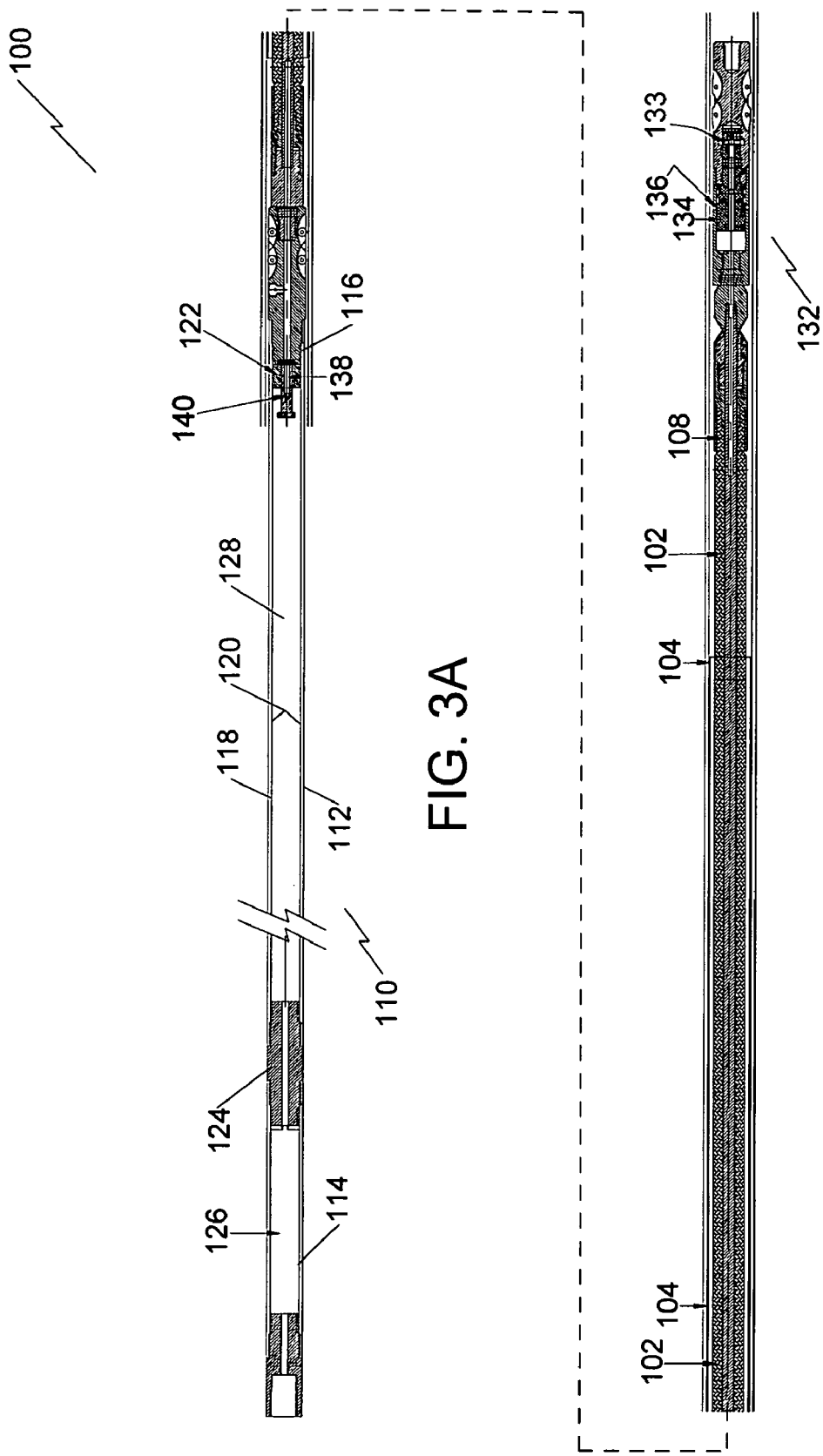

TUBULAR PATCH EXPANSION APPARATUS WITH INFLATABLE BLADDER

FIELD OF THE INVENTION

The present invention relates to an apparatus that uses an inflatable bladder to expand a tubular patch to mend a tubular body.

BACKGROUND OF THE INVENTION

Canadian Patent Application 2,509,414 describes an apparatus which is capable of installing a tubular patch.

SUMMARY OF THE INVENTION

According to the present invention there is provided a tubular patch expansion apparatus that constitutes an improvement on Canadian Patent Application 2,509,414. The tubular patch expansion apparatus includes an elongated tubular bladder adapted to expand radially outwardly to expand an overlying tubular patch. The bladder has a first end and a second end. A bladder setting assembly is secured to the first end of the bladder. The bladder setting assembly includes a tubular body having a first end adapted for attachment to a tubing string, a second end adapted for attachment to the first end of the bladder, and an interior wall defining an interior bore. A piston is positioned in the interior bore in sealing engagement with the interior wall. The piston divides the interior bore into a gas generator chamber toward the first end of the tubular body and a relatively larger liquid chamber toward the second end of the tubular body. A gas generating medium is positioned in the gas generator chamber. A liquid is positioned in the liquid chamber. Means are provided for igniting the gas generating medium. Once ignited, the gas generating medium generates gas, which causes the piston to move along the interior bore injecting liquid from the liquid chamber into the bladder to inflate the bladder. A liquid pressure relief assembly is positioned at the second end of the bladder. The liquid pressure relief assembly is adapted to relieve pressure within the bladder by releasing liquid from the bladder to allow the bladder to collapse, when the pressure in the bladder reaches predetermined levels.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIGS. 1A–1B are side elevation views, in section, of a tubular patch expansion apparatus constructed in accordance with the teachings of the present invention, prior to expansion of the bladder.

FIGS. 3A–3B are side elevation views, in section, of the tubular patch expansion apparatus illustrated in FIG. 1, after pressure is released to collapse the bladder.

DETAILED DESCRIPTION OF THE PREFERRED EMBODIMENT

Figures 2A, 2B:
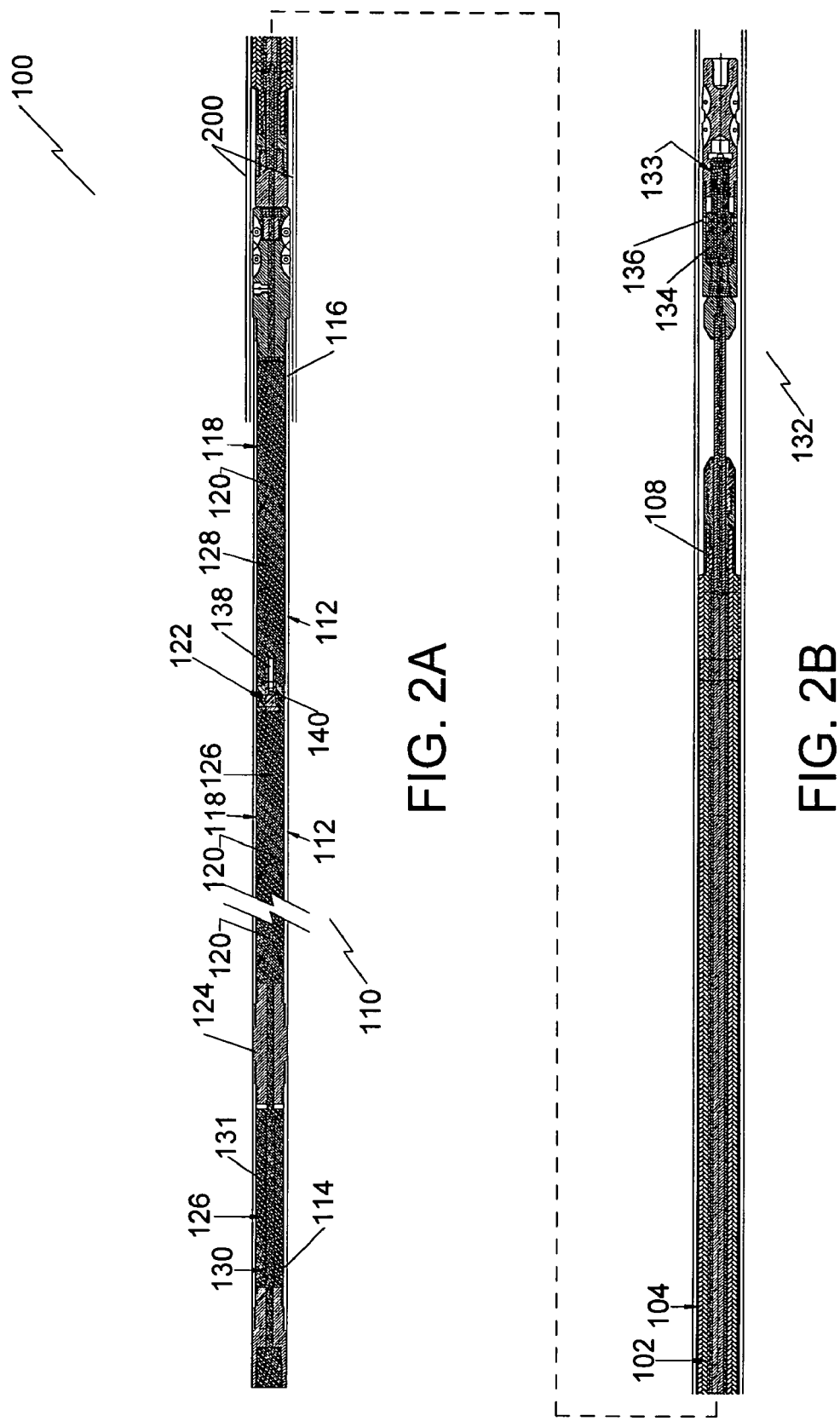
FIGS. 2A–2B side elevation views, in section, of the tubular patch expansion apparatus illustrated in FIG. 1, with the bladder and patch expanded.

The preferred embodiment, a tubular patch expansion apparatus generally identified by reference numeral 100, will now be described with reference to FIG. 1A through 8.

Figure 4:
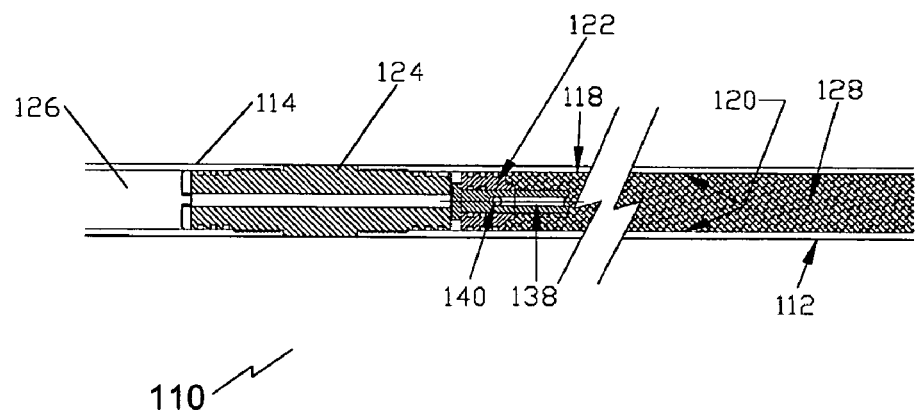
FIG. 4 is a detailed side elevation view, in section, of the first end of the tubular body of the bladder setting assembly.
Figure 5:
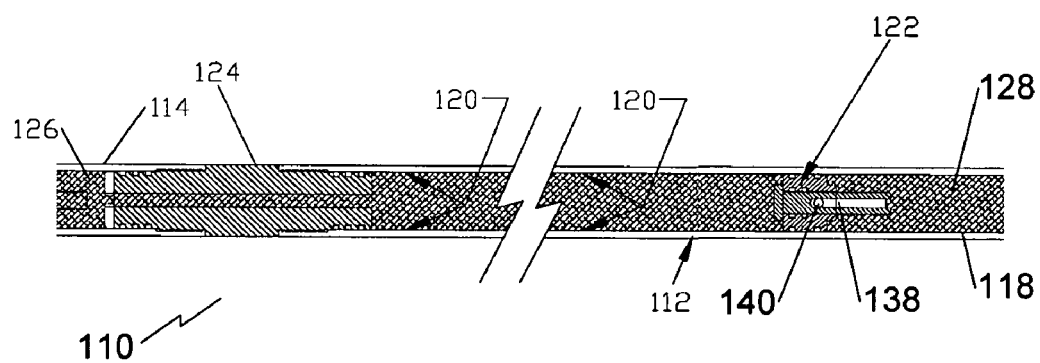
FIG. 5 is a detailed side elevation view, in section, of the first end of the tubular body of the bladder setting assembly with the piston applying pressure to the fluid contained in the tubular body.
Figure 6:
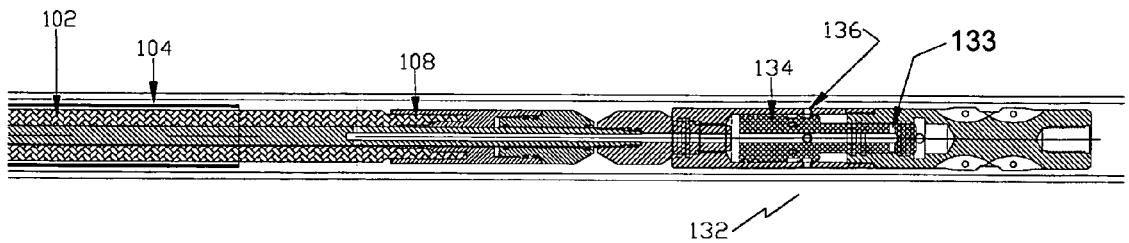
FIG. 6 is a detailed side elevation view, in section, of the liquid pressure relief assembly with the tubular bladder and overlying tubular patch prepared to be expanded.
Figure 7:
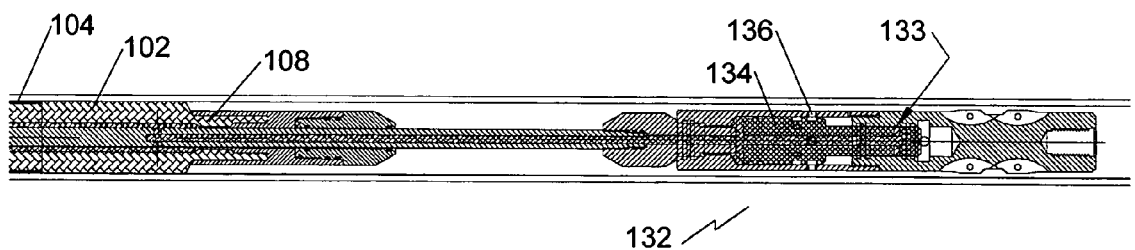
FIG. 7 is a detailed side elevation view, in section, of the liquid pressure relief assembly with the tubular bladder and overlying tubular patch expanded.
Figure 8:
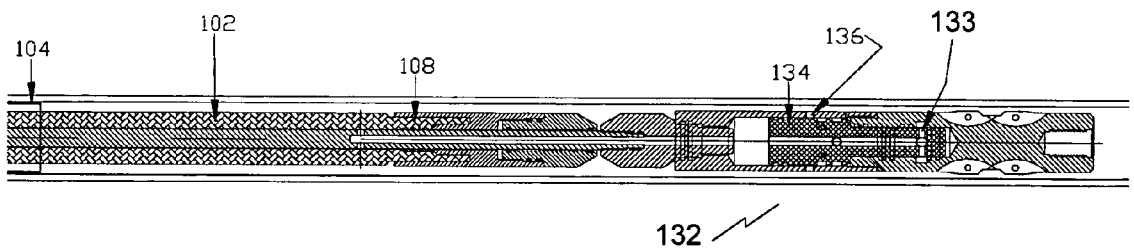
FIG. 8 is a detailed side elevation view, in section, of the liquid pressure relief assembly with the tubular bladder deflated, and the overlying tubular patch expanded.

Structure and Relationship of Parts:

Referring to FIGS. 1A and 1B, tubular patch expansion apparatus 100 includes an elongated tubular bladder 102 adapted to expand radially outwardly to expand an overlying tubular patch 104. Bladder 102 has a first end 106 and a second end 108. A bladder setting assembly, generally indicated by reference numeral 110, is secured to first end 106 of bladder 102. Bladder setting assembly 110 includes a tubular body 112 having a first end 114 adapted for attachment to a tubing string (not shown) and a second end 116 adapted for attachment to first end 106 of bladder 102. Tubular body 112 has an interior wall 118 defining an interior bore 120. A piston 122 is positioned in interior bore 120 in sealing engagement with interior wall 118. A tubular stopper 124 is positioned in interior bore 120 which limits movement of piston 122 toward first end 114 of tubular body 112. As will be hereinafter further in relation to operation, piston 122 serves to divide interior bore 120 into a gas generator chamber 126 toward first end 114 of tubular body 112 and a relatively larger liquid chamber 128 toward second end 116 of tubular body 112. Referring to FIGS. 2A and 2B, a gas generating medium 130 is positioned in gas generator chamber 126 forward of tubular stopper 124. A liquid, preferably oil, is positioned in liquid chamber 128. Black powder pellets 131, which can be ignited remotely through an electric current or mechanical means such as a firing head (not shown), are used as means for igniting gas generating medium 130. Referring to FIGS. 3A and 3B, a liquid pressure relief assembly, generally identified by reference numeral 132, is positioned at second end 108 of bladder 102. Liquid pressure relief assembly 132 is adapted to relieve pressure within bladder 102 by releasing liquid out a vent hole 133 from bladder 102 to allow bladder 102 to collapse when the pressure in bladder 102 reaches predetermined levels. Liquid pressure relief assembly 132 includes a piston plug 134 blocking second end 108 of bladder 102. Referring to FIGS. 6 through 8, piston plug 134 is secured in position by shear screws 136. Referring to FIG. 4 and FIG. 5, there is also means provided for relieving gas pressure from gas generator chamber 126 once the bladder has been expanded sufficiently. Piston 122 has an axial passage 138 in which is positioned a gas pressure relief valve 140 which is opened when a sufficient pressure differential is applied.

Operation:

The operation of tubular patch expansion apparatus 100 will now be described with reference to FIGS. 1A through 8. Referring to FIGS. 1A and 1B, tubular patch expansion apparatus 10 is positioned within a tubular conduit that requires patching, a section of production tubing 200 has been illustrated. Tubular patch 104 overlies bladder 102. Referring to FIGS. 2A and 2B, an electric charge is sent down on a wireline (not shown) from surface to ignite black powder pellets 131, which in turn ignites gas generating medium 130. As gas generating medium 130 generates gas, pressure builds in gas generator chamber 126, which causes piston 122 to move from its original position shown in FIG. 4 along interior bore 120 as shown in FIG. 5, where the shaded region in gas generator chamber 126 represents the generated gas. Referring again to FIGS. 2A and 2B, the movement of piston 122 reduces the size of liquid chamber 128, resulting in increased pressure and the injection of liquid from liquid chamber 128 into bladder 102 to inflate bladder 102. FIG. 6 shows one end of bladder 102 before being inflated with tubular patch 104 crimped on to bladder 102, and FIG. 7 show bladder 102 inflated and tubular patch 104 expanded. Referring to FIGS. 3A and 3B, pressure continues to build within bladder 102 and bladder continues to inflate until tubular patch 104 is fully expanded. Once tubular patch 104 is fully expanded, pressure continues to increase within bladder 102. However, referring to FIG. 8, once a preset pressure level is reached, shear screws 136 shear allowing piston plug 134 to move clear of second end 108 of bladder 102. Beneficial results have been obtained during testing with the shear screws shearing at 12,000 psi. It will be understood that the pressure relief level can vary with the application. Once piston plug 134 is out of the way, all of the oil within bladder 102 is able to escape. Referring to FIGS. 3A and 3B, once the oil is released, bladder 102 collapses, enabling the tool to be withdrawn. If tubular patch expansion apparatus 10 were brought to surface with built up gas pressure remaining in the tool, it would constitute a danger to personnel. For this reason, gas pressure relief valve 140 is provided in piston 122. Gas pressure relief valve 140 acts upon pressure differential. Once liquid has been released from bladder 102, a pressure differential is created which triggers gas pressure relief valve 140. Gas pressure relief valve 140 releases pressure from gas generator chamber 126 by allowing the passage of gas through axial passage 138 in piston 122 upon a preset pressure differential being reached.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A tubular patch expansion apparatus, comprising:
    an elongated tubular bladder adapted to expand radially outwardly to expand an overlying tubular patch, the bladder having a first end and a second end;
    a bladder setting assembly secured to the first end of the bladder, the bladder setting assembly including:
        a tubular body having a first end adapted for attachment to a tubing string, a second end adapted for attachment to the first end of the bladder, and an interior wall defining an interior bore;
        a piston positioned in the interior bore in sealing engagement with the interior wall, the piston dividing the interior bore into a gas generator chamber toward the first end of the tubular body and a relatively larger liquid chamber toward the second end of the tubular body;
        a gas generating medium positioned in the gas generator chamber;
        a liquid positioned in the liquid chamber;
        means for igniting the gas generating medium, the gas generating medium generating gas which causes the piston to move along the interior bore injecting liquid from the liquid chamber into the bladder to inflate the bladder; and
    a liquid pressure relief assembly positioned at the second end of the bladder, the liquid pressure relief assembly being adapted to relieve pressure within the bladder by releasing liquid from the bladder to allow the bladder to collapse when the pressure in the bladder reaches predetermined levels.

2. The tubular patch expansion apparatus as defined in claim 1, wherein the liquid is oil.

3. The tubular patch expansion apparatus as defined in claim 1, wherein the piston has an axial passage in which is positioned a gas pressure relief valve, the gas pressure relief valve releasing pressure from the gas generator chamber by allowing the passage of gas through the axial passage in the piston upon a preset pressure differential being reached.

4. The tubular patch expansion apparatus as defined in claim 1, wherein the liquid pressure relief assembly includes a piston plug blocking the second end of the bladder, the piston plug being secured in position by shear screws, such that upon a preset pressure level being reached the shear screws are sheared allowing the piston plug to move clear of the second end of the bladder.

* * * * *